(12) United States Patent
Oka et al.

(10) Patent No.: US 9,534,101 B2
(45) Date of Patent: Jan. 3, 2017

(54) RUBBER COMPOSITION FOR TIRE

(71) Applicant: The Yokohama Rubber Co., LTD., Minato-ku, Tokyo (JP)

(72) Inventors: Miyuki Oka, Hiratsuka (JP); Yoshihiro Kameda, Hiratsuka (JP)

(73) Assignee: The Yokohama Co., LTD. (JP)

( * ) Notice: Subject to any disclaimer, the term of this patent is extended or adjusted under 35 U.S.C. 154(b) by 0 days.

(21) Appl. No.: 14/780,995

(22) PCT Filed: Mar. 26, 2014

(86) PCT No.: PCT/JP2014/058528
§ 371 (c)(1),
(2) Date: Sep. 28, 2015

(87) PCT Pub. No.: WO2014/157335
PCT Pub. Date: Oct. 2, 2014

(65) Prior Publication Data
US 2016/0053076 A1   Feb. 25, 2016

(30) Foreign Application Priority Data
Mar. 28, 2013   (JP) .................. 2013-068020

(51) Int. Cl.
| | | |
|---|---|---|
| C08K 3/34 | (2006.01) | |
| B60C 1/00 | (2006.01) | |
| C08K 3/04 | (2006.01) | |
| C08L 7/00 | (2006.01) | |
| C08L 9/00 | (2006.01) | |

(52) U.S. Cl.
CPC .............. C08K 3/346 (2013.01); B60C 1/00 (2013.01); C08K 3/04 (2013.01); C08L 7/00 (2013.01); C08L 9/00 (2013.01); C08K 2003/045 (2013.01); C08K 2201/003 (2013.01)

(58) Field of Classification Search
CPC .................. C08K 3/346; C08K 3/04

USPC ........................................................ 524/444
See application file for complete search history.

(56) References Cited

U.S. PATENT DOCUMENTS

| | | | |
|---|---|---|---|
| 4,617,454 A | 10/1986 | Greenhalgh | |
| 5,871,846 A | 2/1999 | Freeman et al. | |
| 2008/0105346 A1* | 5/2008 | Toyoda ................ | B60C 1/0016 152/209.4 |

FOREIGN PATENT DOCUMENTS

| | | | |
|---|---|---|---|
| JP | S60-173801 | 9/1985 | |
| JP | H10-88028 | 4/1998 | |
| JP | 2000-256506 | 9/2000 | |
| JP | 2000-273241 | 10/2000 | |
| JP | 2001-089598 | 4/2001 | |
| JP | 2002-080638 | 3/2002 | |
| JP | 2005-213353 | 8/2005 | |
| JP | 2008-184505 | 8/2008 | |
| JP | 2010006133 | * 1/2010 | |
| WO | WO 2006/062119 | 6/2006 | |

OTHER PUBLICATIONS

Translation of JP 2010-006133, Jan. 14, 2010.*
International Search Report for International Application No. PCT/JP2014/058528 dated Jul. 1, 2014, 4 pages, Japan.

* cited by examiner

*Primary Examiner* — Hui Chin
(74) *Attorney, Agent, or Firm* — Thorpe North & Western

(57) ABSTRACT

The present technology provides a rubber composition comprising from 30 to 100 parts by weight of a carbon black, and from 10 to 80 parts by weight of an inorganic filler per 100 parts by weight of a diene rubber, wherein the inorganic filler has from 20 to 80% particles of a particle size of at most 5 μm; and when an aluminum content in the inorganic filler is defined as Wal wt. % and a silicon content is defined as Wsi wt. %, the aluminum content Wal is from 11 to 40 wt. %, and a ratio Wal/(Wal+Wsi)×100 of aluminum to a total of aluminum and silicon is from 15 to 38 wt. %.

2 Claims, 1 Drawing Sheet

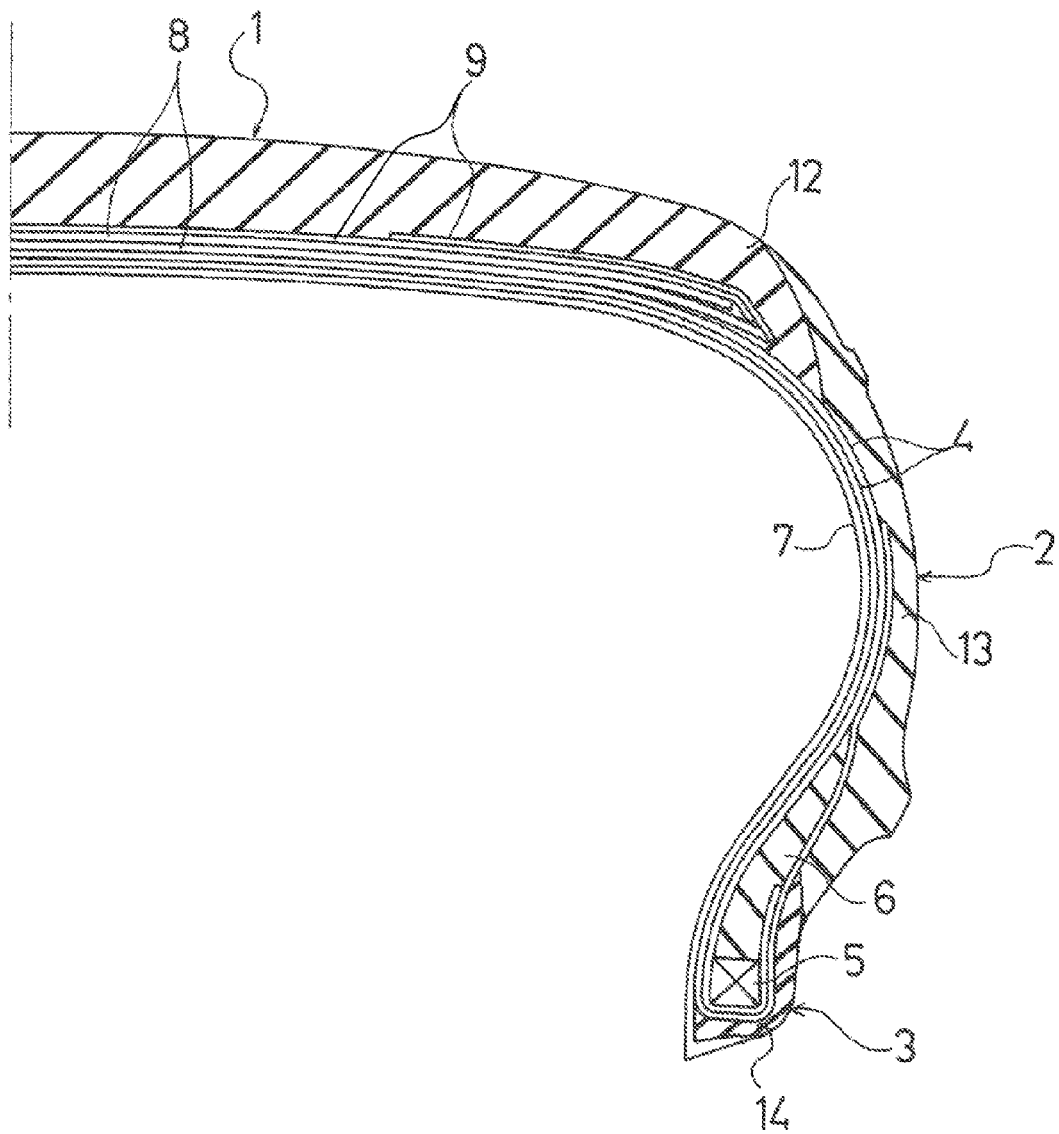

RUBBER COMPOSITION FOR TIRE

TECHNICAL FIELD

The present technology relates to a rubber composition for a tire which improves the rubber hardness, strength, and processability equal to or greater than conventional levels.

BACKGROUND

Conventionally, clay is blended into rubber compositions for a tire for the purpose of securing a weighting effect (cost reduction) or molding stability. However, rubber compositions containing clay instead of carbon black have had problems in that the rubber hardness and strength are diminished in comparison to rubber compositions containing carbon black.

Japanese Unexamined Patent Application Publication No. 2002-80638A proposes a rubber composition for a tire tread containing a clay having an average particle size of at most 10 μm and carbon black having a nitrogen adsorption specific surface area from 70 to 300 m²/g.

However, the processability may be diminished in a rubber composition containing a clay having an average particle size of at most 10 μm, and a rubber composition for a tire which simultaneously achieves the rubber hardness, strength, and processability has not yet been established.

SUMMARY

The present technology provides a rubber composition for a tire which contains clay and improves the rubber hardness, strength, and processability equal to or greater than conventional levels.

The rubber composition for a tire according to the present technology which achieves the object described above comprises from 30 to 100 parts by weight of a carbon black, and from 10 to 80 parts by weight of an inorganic filler per 100 parts by weight of a diene rubber, wherein the inorganic filler has from 20 to 80% particles of a particle size of at most 5 μm; and when an aluminum content in the inorganic filler is defined as Wal wt. % and a silicon content is defined as Wsi wt. %, the aluminum content Wal is from 11 to 40 wt. %, and a ratio Wal/(Wal+Wsi)×100 of aluminum to a total of aluminum and silicon is from 15 to 38 wt. %.

The rubber composition for a tire according to the present technology contains a specific inorganic filler having limited aluminum and silicon contents as well as a particle size, so the rubber hardness, strength, and processability can be improved equal to or greater than conventional levels.

The carbon black preferably has a nitrogen adsorption specific surface area from 15 to 40 m²/g and a DBP (dibutyl phthalate) absorption from 50 to 120 mL/100 g.

In a pneumatic tire comprising a bead portion formed using the rubber composition for a tire according to the present technology, a pneumatic tire having excellent tire performance can be produced while stably maintaining the high quality.

BRIEF DESCRIPTION OF THE DRAWING

FIG. 1 is a partial cross-sectional view in a tire meridian direction illustrating an example of an embodiment of a pneumatic tire in which a rubber composition for a tire of the present technology is used.

DETAILED DESCRIPTION

FIG. 1 illustrates an example of an embodiment of a pneumatic tire in which rubber composition for a tire is used for a tread portion. The pneumatic tire comprises a tread portion 1, a side wall portion 2, and a bead portion 3. Of these, the rubber composition for a tire according to the present technology is used in the bead portion 3.

In FIG. 1, two layers of a carcass layer 4, formed by arranging reinforcing cords extending in a tire radial direction in a tire circumferential direction at a predetermined pitch and embedding these reinforcing cords in a rubber layer, is disposed extending between left and right bead portions 3. Both ends are made to sandwich a bead filler 6 around a bead core 5 that is embedded in the bead portions 3 and are folded back in a tire axial direction from the inside to the outside. An inner liner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, are disposed on an outer circumferential side of the carcass layer 4 of the tread portion 1. The reinforcing cords of the two layers of a belt layer 8 cross interlamilarly so that the incline directions with respect to the tire circumferential direction are opposite each other. A belt cover layer 9 is disposed on an outer circumferential side of the belt layers 8. The tread portion 1 is formed from a tread rubber layer 12 on an outer circumferential side of the belt cover layer 9. A side rubber layer 13 is disposed outward of the carcass layer 4 in each side wall portion 2, and a rim cushion rubber layer 14 is provided outward of the portion of the carcass layer 4 that is folded back around each of the bead portions 3.

The rubber component of the rubber composition for a tire according to the present technology is composed of a diene rubber. Examples of diene rubbers include natural rubber, isoprene rubber, butadiene rubber, styrene-butadiene rubber, butyl rubber, and acrylonitrile-butadiene rubber. Of these, natural rubber and styrene-butadiene rubber are preferable. When the diene rubber is composed of natural rubber and styrene-butadiene rubber, a suitable composition is one in which the natural rubber is preferably from 30 to 90 wt. % more preferably from 50 to 80 wt. % and the styrene-butadiene rubber is preferably from 10 to 70 wt. % and more preferably from 20 to 50 wt. % per 100 wt. % of the diene rubber.

In this rubber composition, carbon black and an inorganic filler are necessarily blended into the diene rubber described above. The compounded amount of the inorganic filler is from 10 to 80 parts by weight and preferably from 20 to 60 parts by weight per 100 parts by weight of the diene rubber. By setting the compounded amount of the inorganic filler to 10 to 80 parts by weight, it is possible to ensure that the effect of adding a specific inorganic filler is reflected in the properties of the rubber composition.

The ratio of particles having a particle size of at most 5 μm in the inorganic filler is set to 20 to 80%, and preferably 20 to 60%. By setting the ratio of particles having a particle size of at most 5 μm to at least 20%, it is possible to enhance reinforcing performance such as the rubber hardness and strength of the rubber composition. In addition, by setting the ratio of particles having a particle size of at most 5 μm to at most 80%, it is possible to achieve favorable processability by suppressing increases in the viscosity of the rubber composition. In this specification, the particle size of the inorganic filler is measured by a laser diffraction method based on JIS (Japanese Industrial Standard) 8825-1. In addition, the ratio of particles having a particle size of at most 5 μm was determined by finding the cumulative particle size distribution, which expresses the relationship between the particle size and the number of particles, from the obtained measurement and then calculating the numerical ratio of particles having a particle size of at most 5 μm.

In addition, the inorganic filler is an inorganic filler containing aluminum and silicon. In the present technology, when the aluminum content in the inorganic filler is defined as Wal wt. % and the silicon content is defined as Wsi wt. %, the aluminum content Wal is set to 11 to 40 wt. %, and the ratio Wal/(Wal+Wsi)×100 of aluminum to the total of aluminum and silicon is set to 15 to 38 wt. %.

The aluminum content Wal of the inorganic filler is from 11 to 40 wt. % and preferably from 11 to 35 wt. %. By setting the aluminum content Wal to at least 11 wt. %, it is possible to improve the hardness of the rubber composition. In addition, by setting the aluminum content Wal to at most 40 wt. %, it is possible to enhance the processability of the rubber composition.

The ratio Wal/(Wal+Wsi)×100 of aluminum to the total of aluminum and silicon in the inorganic filler is from 15 to 38 wt. % and preferably from 16 to 35 wt. %. By setting the ratio Wal/(Wal+Wsi)×100 to at least 15 wt. %, it is possible to achieve favorable reinforcing properties by increasing the hardness and tensile strength of the rubber composition. In addition, by setting the ratio Wal/(Wal+Wsi)×100 to at most 38 wt. %, it is possible to achieve favorable processability by suppressing increases in the viscosity of the rubber composition.

In this specification, the aluminum content Wal wt. % and the silicon content Wsi wt. % in the inorganic filler are measured by fluorescent X-ray analysis based on JIS K0119.

The type of the inorganic filler is not particularly limited as long as it satisfies the ranges of the particle size and compositions of aluminum and silicon described above. Examples of inorganic fillers include clay, micas, and pyrophyllite minerals. Of these, clay is preferable.

The rubber composition of the present technology necessarily contains carbon black. The compounded amount of the carbon black is from 30 to 100 parts by weight and preferably from 40 to 85 parts by weight per 100 parts by weight of the diene rubber. By setting the compounded amount of the carbon black to at least 30 parts by weight, it is possible to improve the tensile strength and hardness. In addition, by setting the compounded amount of the carbon black to at most 100 parts by weight, it is possible to suppress the deterioration of processability.

Further, in the rubber composition for a tire according to the present technology, the weight ratio (inorganic filler/carbon black) is preferably set to (10/90) to (70/30) and more preferably (30/70) to (60/40) as the ratio of the compounded amounts of the inorganic filler to carbon black. By setting the weight ratio (inorganic filler/carbon black) to at least (10/90), it is possible to suppress the deterioration of processability. In addition, by setting the weight ratio (inorganic filler/carbon black) to at most (70/30), it is possible to improve the processability.

The nitrogen adsorption specific surface area of the carbon black is preferably from 15 to 40 $m^2/g$ and more preferably from 25 to 35 $m^2/g$. By setting the nitrogen adsorption specific surface area to at least 15 $m^2/g$, it is possible to increase hardness. In addition, by setting the nitrogen adsorption specific surface area to at most 40 $m^2/g$, it is possible to improve the processability. In this specification, the nitrogen adsorption specific surface area of the carbon black is measured with a BET (Brunauer-Emmett-Teller) method based on ASTM (American Society for Testing and Materials) D1993-03.

The DBP absorption of the carbon black is preferably from 50 to 120 $m^2/g$ and more preferably from 80 to 100 $m^2/g$. By setting the DBP absorption to at least 50 $m^2/g$, it is possible to increase the tensile strength and hardness. In addition, by setting the DBP absorption to at most 120 $m^2/g$, it is possible to suppress the deterioration of processability. In this specification, the DBP absorption of the carbon black was measured with a BET method based on JIS K6217-4.

In the present technology, other fillers other than the limited inorganic fillers and carbon black described above may be blended into the rubber composition. Examples of other fillers include talc, mica, calcium carbonate, aluminum hydroxide, aluminum oxide, and titanium oxide.

In the rubber composition for a tire according to the present technology, the rubber composition may also contain various types of additives that are commonly used in rubber compositions for a tire, such as vulcanization or crosslinking agents, vulcanization accelerators, antiaging agents, plasticizers, processing aids, liquid polymers, terpene resins, and thermosetting resins in a range that does not impede the object of the present technology. These additives may be kneaded with a common method to form the rubber composition and may be used in vulcanization or crosslinking. The compounded amount of these additives may be any conventional ratio, as long as the object of the present technology is not impaired. The rubber composition for a tire according to the present technology can be produced by mixing each of the components described above using a commonly used rubber kneading machine such as a Banbury mixer, a kneader, and a roller.

The rubber composition for a tire according to the present technology can be used to form a tread portion, a side wall portion, or a bead portion of a pneumatic tire. Of these, it is preferable to form the bead portion with this rubber composition for a tire. A pneumatic tire having a bead portion formed using the rubber composition for a tire according to the present technology has excellent tire performance such as steering stability and durability due to the high rubber hardness and strength of the rubber composition. In addition, since the processability of the rubber composition is favorable, the composition can be produced while stably maintaining the high quality.

The present technology is further explained below by working examples. However, the scope of the present technology is not limited to these working examples.

EXAMPLES

Using the compounding agents shown in Table 4 as a shared formulation, 14 types of rubber compositions for a tire consisting of the formulations shown in Tables 1 and 2

(Working Examples 1 to 7 and Comparative Examples 1 to 7), excluding sulfur and vulcanization accelerators were kneaded in a 1.8 L sealed mixer for 5 minutes at 160° C. and extruded as a master batch. The sulfur and the vulcanization accelerators were added to this master batch and kneaded in open rolls to prepare the rubber compositions for a tire. Note that the amounts of the shared formulation shown in Table 4 are expressed as parts by weight per 100 parts by weight of the diene rubbers (100 parts by weight of the net amount of rubber) shown in Tables 1 and 2.

The processability of the 14 types of obtained rubber compositions for a tire was evaluated by measuring the Mooney viscosity with the method indicated below.

Processability (Mooney Viscosity)

The Mooney viscosity of the obtained rubber composition was measured in accordance with JIS K6300 using a Mooney viscometer with an L-type rotor (diameter: 38.1 mm, thickness: 5.5 mm) under conditions with a preheating time of 1 minute, a rotor rotation time of 4 minutes, a temperature of 100° C., and a revolution speed of 2 rpm. The obtained results are shown in the "Processability" rows of Tables 1 and 2 as index values with the value of Comparative Example 1 being expressed as an index of 100. Smaller values of this index mean that the viscosity is smaller and the processability is better.

Vulcanized rubber test pieces were fabricated by pressure-vulcanizing the obtained 14 types of rubber compositions for a tire in a mold having a predetermined shape for 20 minutes at 160° C. The rubber hardness and tensile strength were then measured according to the methods described below.

Rubber Hardness

In accordance with JIS K6253, a type A durometer was used to measure the rubber hardness of the obtained vulcanized rubber test pieces at a temperature of 20° C. The obtained results are shown as an index in the "Rubber hardness" rows of Tables 1 and 2, with the value of Comparative Example 1 being expressed as an index of 100. Higher index values mean that the rubber hardness is high and mechanical characteristics are excellent, and that the steering stability is excellent when formed into a pneumatic tire.

Tensile Strength

JIS #3 dumbbell test pieces (thickness: 2 mm) were punched from the obtained vulcanized rubber test pieces in accordance with JIS K6251. The test was conducted at 20° C. at a pulling rate of 500 mm/minute, and the tensile break strength was measured. The obtained results are shown in the "Tensile strength" rows of Tables 1 and 2, with the value of Comparative Example 1 being expressed as an index of 100. Larger index values mean that the tensile break strength is larger and the mechanical characteristics are excellent, and that the abrasion resistance and steering stability are excellent when formed into a pneumatic tire.

TABLE 1

| | | Comparative Example 1 | Working Example 1 | Working Example 2 | Working Example 3 | Working Example 4 | Working Example 5 | Working Example 6 | Working Example 7 |
| --- | --- | --- | --- | --- | --- | --- | --- | --- | --- |
| NR | pbw | 60 | 60 | 60 | 60 | 60 | 60 | 60 | 60 |
| SBR | pbw | 40 | 40 | 40 | 40 | 40 | 40 | 40 | 40 |
| Carbon black 1 | pbw | 50 | 50 | 50 | 50 | 50 | | 30 | 60 |
| Carbon black 2 | pbw | | | | | | 50 | | |
| Inorganic filler type | pbw | Clay 3 | Clay 6 | Clay 7 | Clay 8 | Clay 9 | Clay 7 | Clay 7 | Clay 7 |
| Compounded amount of inorganic filler | pbw | 50 | 50 | 50 | 50 | 50 | 50 | 75 | 40 |
| Processability | Index value | 100 | 98 | 97 | 99 | 95 | 110 | 95 | 100 |
| Rubber hardness | Index value | 100 | 101 | 109 | 108 | 104 | 112 | 101 | 110 |
| Tensile strength | Index value | 100 | 105 | 110 | 112 | 108 | 111 | 100 | 111 |

TABLE 2

| | | Comparative Example 2 | Comparative Example 3 | Comparative Example 4 | Comparative Example 5 | Comparative Example 6 | Comparative Example 7 |
| --- | --- | --- | --- | --- | --- | --- | --- |
| NR | pbw | 60 | 60 | 60 | 60 | 60 | 60 |
| SBR | pbw | 40 | 40 | 40 | 40 | 40 | 40 |
| Carbon black 1 | pbw | 50 | 50 | 50 | 50 | 100 | |
| Carbon black 2 | pbw | | | | | | |
| Inorganic filler type | pbw | Clay 1 | Clay 2 | Clay 4 | Clay 5 | No | Clay 7 |
| Compounded amount of inorganic filler | pbw | 50 | 50 | 50 | 50 | | 100 |
| Processability | Index value | 100 | 99 | 110 | 110 | 130 | 90 |
| Rubber hardness | Index value | 98 | 99 | 115 | 107 | 120 | 95 |
| Tensile strength | Index value | 97 | 93 | 115 | 110 | 115 | 94 |

The types of raw materials used in Tables 1 and 2 are shown below.

NR: natural rubber, STR-20

SBR: emulsion polymerization styrene-butadiene rubber; Nipol 1502 manufactured by Zeon Corporation Carbon black 1: nitrogen adsorption specific surface area (BET) of 35 $m^2/g$, DBP absorption of 85 mL/100 g, N660 manufactured by NSCC Carbon Co., Ltd. (Niteron # GN)

Carbon black 2: nitrogen adsorption specific surface area (BET) of 90 $m^2/g$, DBP absorption of 122 mL/100 g, N339 (THAIBLACK N339) manufactured by THAI CARBON BLACK PUBLICK CO.

Clays 1 to 9: clays with the ratios of particles having a particle size of at most 5 μm and the chemical compositions including the aluminum content and the ratio of aluminum to the total amount of aluminum and silicon shown in Table 3

TABLE 3

| | Ratio of particles having particle size of at most 5 μm | Al content Wal wt. % | Al ratio in the amount of Al and Si Wal/(Wal + Wsi) × 100 wt. % | Inorganic filler product name |
|---|---|---|---|---|
| Clay 1 | 16.1 | 10.4 | 10 | Catalpo Y manufactured by Sanyo Clay Industrial Co., Ltd. |
| Clay 2 | 19.9 | 7.8 | 14 | T Clay manufactured by Saitama Mining Co., Ltd. |
| Clay 3 | 36.1 | 9.6 | 14 | Catalpo Y2 manufactured by Sanyo Clay Industrial Co., Ltd. |
| Clay 4 | 97.1 | 28.8 | 39 | Suprex manufactured by Kentucky Tennessee Clay |
| Clay 5 | 38.5 | 31.4 | 39 | Franlin R manufactured by Kentucky Tennessee Clay |
| Clay 6 | 25.5 | 13.0 | 16 | Catalpo YK manufactured by Sanyo Clay Industrial Co., Ltd. |
| Clay 7 | 23.7 | 28.7 | 35 | Eckalite 120 manufactured by Imerys Performance Minerals |
| Clay 8 | 25.6 | 31.4 | 38 | Hydrite Flat DS manufactured by Imerys Performance Minerals |
| Clay 9 | 48.0 | 14.3 | 16 | Union Clay manufactured by Sobue Clay Co., Ltd. |

TABLE 4

| Shared formulation of rubber composition for a tire | | |
|---|---|---|
| Zinc oxide | 3.0 | pbw |
| Stearic acid | 2.0 | pbw |
| Oil | 12.5 | pbw |
| Sulfur | 2.5 | pbw |
| Vulcanization accelerator | 1.5 | pbw |

The types of raw materials used in Table 4 are shown below.

Zinc oxide: Zinc Oxide III, manufactured by Seido Chemical Industry Co., Ltd.

Stearic acid: Beads Stearic Acid YR (manufactured by NOF Corp.)

Oil: Extract No. 4S, manufactured by Showa Shell Sekiyu K.K.

Sulfur: oil-treated sulfur, manufactured by Hosoi Chemical Industry Co., Ltd.

Vulcanization accelerator: Nocceler CZ-G, manufactured by Ouchi Shinko Chemical Industrial Co., Ltd.

As clearly shown in Table 1, it was confirmed that the rubber compositions for a tire according to Working Examples 1 to 7 improved the processability, rubber hardness, and tensile strength equal to or greater than conventional levels.

In contrast, in the rubber composition for a tire according to Comparative Example 1, the aluminum content Wal of clay 3 is less than 11 wt. %, and the ratio Wal/(Wal+Wsi) of aluminum to the total amount of aluminum and silicon is less than 15 wt. %, so it is not possible to improve the processability, rubber hardness, and tensile strength as in the case of the rubber compositions of Working Examples 1 to 4.

In the rubber compositions for a tire according to Comparative Examples 2 and 3, the aluminum content Wal of clays 1 and 2 is less than 11 wt. %, the ratio Wal/(Wal+Wsi) of aluminum to the total amount of aluminum and silicon is less than 15 wt. %, and the ratio of particles having a particle size of at most 5 μm is less than 20%, so it is not possible to improve the processability and rubber hardness, and the tensile strength is diminished.

In the rubber composition for a tire according to Comparative Example 4, the ratio Wal/(Wal+Wsi) of aluminum in clay 4 is greater than 38 wt. %, and the ratio of particles having particle size of at most 5 μm is greater than 80%, so the processability is diminished.

In the rubber composition for a tire according to Comparative Example 5, the ratio Wal/(Wal+Wsi) of aluminum in clay 5 is greater than 38 wt. %, so the processability is diminished.

The rubber composition for a tire according to Comparative Example 6 contains no specific clay and contains only carbon black, so the processability is diminished.

The rubber composition for a tire according to Comparative Example 7 contains no carbon black, so the tensile strength and hardness are diminished.

What is claimed is:

1. A rubber composition for a tire comprising from 30 to 100 parts by weight of a carbon black, and from 10 to 80 parts by weight of an inorganic filler per 100 parts by weight of a diene rubber, wherein the inorganic filler has from 20 to 80% particles having a particle size of at most 5μm; and when an aluminum content in the inorganic filler is defined as Wal wt. % and a silicon content is defined as Wsi wt. %, the aluminum content Wal is from 11 to 40 wt. %, and a ratio Wal/(Wal +Wsi) ×100 of aluminum to a total of aluminum and silicon is from 15 to 38 wt. %;

wherein a nitrogen adsorption specific surface area of the carbon black is from 15 to 40 $m^2/g$, and a DBP absorption is from 50 to 120 mL/100 g.

2. A pneumatic tire comprising a bead portion formed of the rubber composition for a tire described in claim 1.

* * * * *